(12) United States Patent
Casper et al.

(10) Patent No.: US 11,352,162 B2
(45) Date of Patent: Jun. 7, 2022

(54) PLASTICS MATERIAL BOTTLE WITH INTERSECTING TENSION BANDS

(71) Applicant: KRONES AG, Neutraubling (DE)

(72) Inventors: Mario Casper, Regensburg (DE); Milena Huber, Regensburg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/302,231

(22) PCT Filed: Aug. 23, 2017

(86) PCT No.: PCT/EP2017/071252
§ 371 (c)(1),
(2) Date: Nov. 16, 2018

(87) PCT Pub. No.: WO2018/037052
PCT Pub. Date: Mar. 1, 2018

(65) Prior Publication Data
US 2019/0210758 A1   Jul. 11, 2019

(30) Foreign Application Priority Data
Aug. 23, 2016  (DE) .................... 10 2016 115 646.9

(51) Int. Cl.
*B65D 1/44*    (2006.01)
*B65D 1/42*    (2006.01)
(Continued)

(52) U.S. Cl.
CPC ............ *B65D 1/44* (2013.01); *B29C 49/04* (2013.01); *B29C 49/48* (2013.01); *B65D 1/0207* (2013.01);
(Continued)

(58) Field of Classification Search
CPC ............ B65D 1/44; B65D 2501/0036; B65D 2501/0027; B65D 79/005; B65D 1/0207; B65D 1/42; B29C 49/48; B29L 2031/7158
(Continued)

(56) References Cited

U.S. PATENT DOCUMENTS 8,939,316 B2 *  1/2015  Pasutanon ................ B65D 1/42
                                                215/382
2007/0257003 A1 * 11/2007  Colloud ............... B65D 1/0223
                                                215/382
(Continued)

FOREIGN PATENT DOCUMENTS

AT        163924 B     9/1949
CN       2558598 Y     7/2003
(Continued)

OTHER PUBLICATIONS

International Search Report PCT/EP2017/071252.

*Primary Examiner* — Stephen J Castellano
(74) *Attorney, Agent, or Firm* — Schmeiser, Olsen & Watts, LLP

(57) ABSTRACT

Provided is a plastic container with a bottom area and a main body, which adjoins the bottom area in a longitudinal direction of the plastic container, wherein the main body includes a wall which extends all the way around in a circumferential direction of the plastic container and an opening area which at least indirectly adjoins the main body in the longitudinal direction and has a container opening, wherein the circumferential wall of the main body includes at least one first groove and/or elevation extending in a first direction and at least one second groove and/or elevation extending in a second direction.

17 Claims, 3 Drawing Sheets

(51) Int. Cl.
 B29C 49/04 (2006.01)
 B65D 79/00 (2006.01)
 B29C 49/48 (2006.01)
 B65D 1/02 (2006.01)
 B29L 31/00 (2006.01)
(52) U.S. Cl.
 CPC ........... B65D 1/42 (2013.01); B65D 79/0084 (2020.05); *B29C 2049/4882* (2013.01); *B29L 2031/7158* (2013.01); *B65D 2501/0018* (2013.01); *B65D 2501/0027* (2013.01); *B65D 2501/0036* (2013.01)
(58) Field of Classification Search
 USPC ........ 215/382, 383, 384, 375; 220/669, 670, 220/673, 675
 See application file for complete search history.

(56) References Cited

U.S. PATENT DOCUMENTS

| | | | |
|---|---|---|---|
| 2008/0223816 A1* | 9/2008 | Darr | B65D 1/0223 215/382 |
| 2009/0301991 A1 | 12/2009 | Yarro | |
| 2010/0000962 A1* | 1/2010 | Lepoitevin | B65D 1/0223 215/381 |
| 2013/0008913 A1* | 1/2013 | Boukobza | B65D 1/0223 220/669 |
| 2015/0144587 A1* | 5/2015 | Hanan | B65D 1/0284 215/377 |
| 2015/0314907 A1* | 11/2015 | Kira | B65D 1/0223 215/383 |
| 2015/0353225 A1 | 12/2015 | Takieddine et al. | |
| 2016/0167822 A1* | 6/2016 | Oostwouder | B65D 23/0871 206/457 |

FOREIGN PATENT DOCUMENTS

| | | | | |
|---|---|---|---|---|
| CN | 203528982 U | 4/2014 | | |
| CN | 105460340 A | 4/2016 | | |
| CN | 105793161 A | 7/2016 | | |
| DE | 1741121 U | 3/1957 | | |
| DE | 602004008115 T2 | 4/2008 | | |
| DE | 202008012290 U1 | 11/2008 | | |
| FR | 2907763 A1 | 5/2008 | | |
| JP | 2009241940 A | 10/2009 | | |
| WO | 2008022605 A1 | 2/2008 | | |
| WO | WO2008022605 A1 | 2/2008 | | |
| WO | 2009039595 A1 | 4/2009 | | |
| WO | WO2009039595 A2 | 4/2009 | | |
| WO | WO-2009039595 A2 * | 4/2009 | ........... | B65D 1/0284 |

* cited by examiner

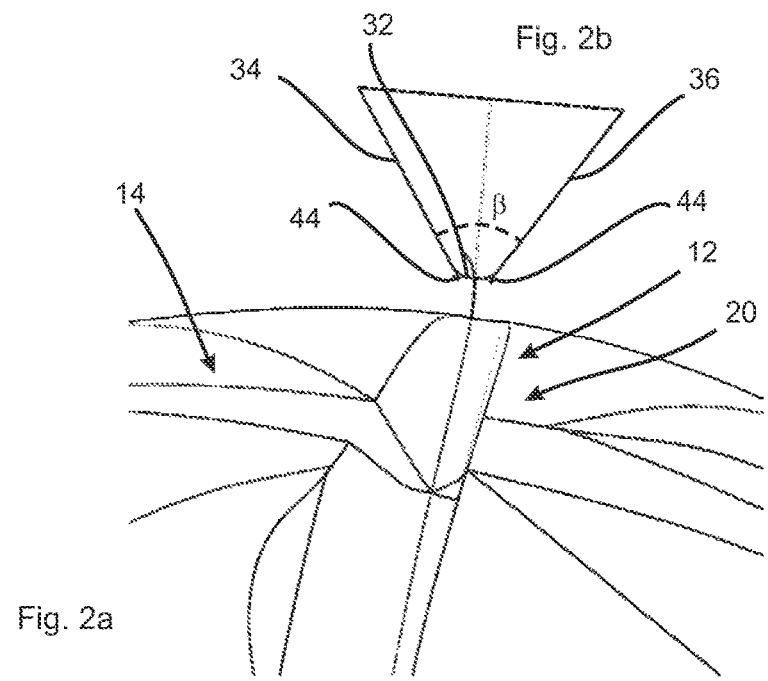
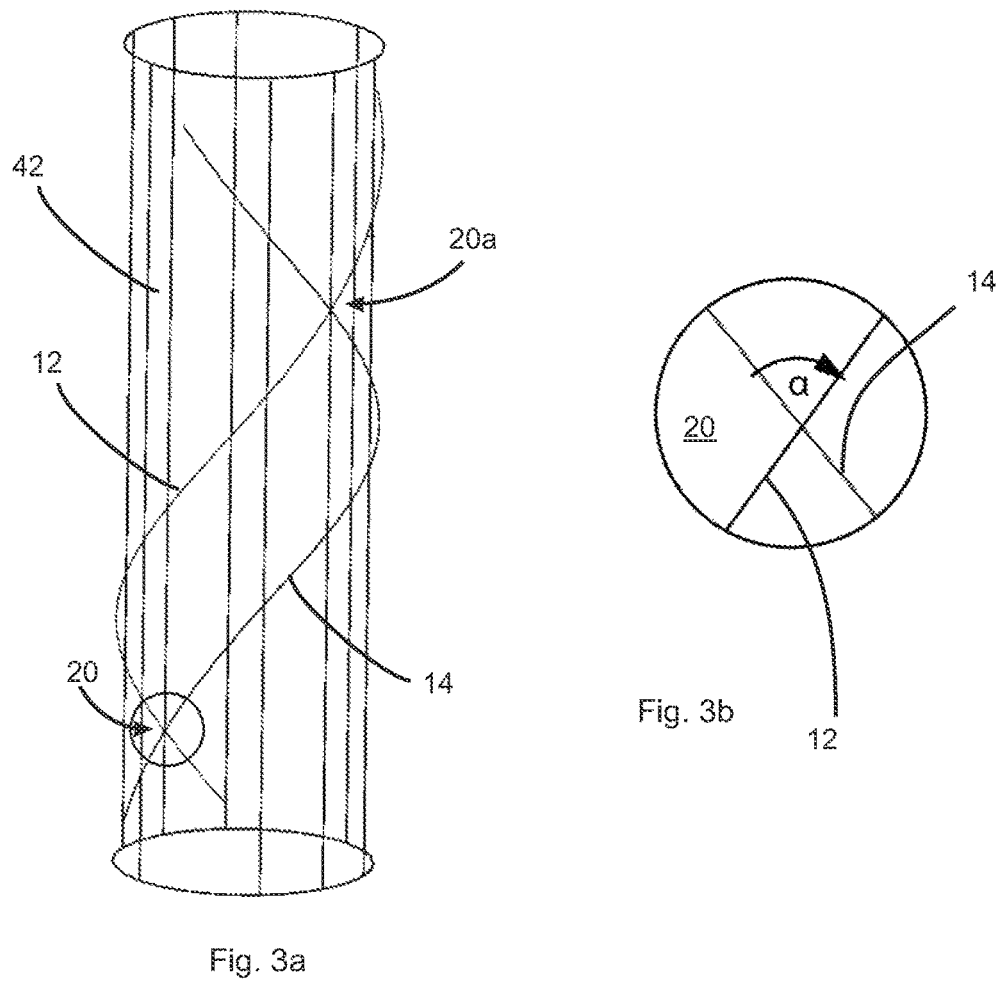

PLASTICS MATERIAL BOTTLE WITH INTERSECTING TENSION BANDS

CROSS-REFERENCE TO RELATED APPLICATIONS

This application claims priority to and is the national stage (Rule 371) of PCT Application No. PCT/EP2017/071252, having a filing date of Aug. 23, 2017, based on German Application No. 10 2016 115 646.9, having a filing date of Aug. 23, 2016, the entire contents both of which are hereby incorporated by reference.

FIELD OF TECHNOLOGY

The following relates to a plastics material container and in particular a plastics material container such as a plastic bottle for beverages. Such containers are usually produced from plastics such as PET. PET containers can deform due to various external influences, such as for example due to line components in the filling line. Very lightweight plastics material containers are particularly affected by this. Also, containers which are subjected to an internal pressure, generated for example by nitrogen or in the case of carbonation of the filling material, are affected by deformation. This internal pressure itself—even in the case of very lightweight containers—can have a deforming effect on the container.

BACKGROUND

For some time, attempts have been made to minimise or to restrict this axial and radial expansion and/or the deformation by the use of suitable channel geometries. This becomes more difficult as the container is made more lightweight. In fact, the best choice would be a container entirely without such channels under internal pressure, but such a container would only have very low stability after opening, that is to say after pressure relief.

Despite years of optimising the channel geometries, they cannot completely restrain axial and at the same time radial expansion of the PET containers under internal pressure. Although for example transverse channels can limit the radial expansion, at the same time they facilitate an axial increase in height. In addition, such channels, which are smoothed out under internal pressure, no longer have any rigidity after the opening of the containers and therefore only provide relatively little stability.

SUMMARY

A plastics material container according to embodiments of the invention has a base region and a main body adjoining this base region in a longitudinal direction of the plastics material container, this main body having a peripheral wall extending completely around a peripheral direction of the plastics material container. Furthermore, the plastics material container has a mouth region with a container mouth following at least indirectly to this main body in the longitudinal direction.

This peripheral wall (of the main body) advantageously has at least one first groove and/or protrusion extending in a first direction and at least one second groove and/or protrusion extending in a second direction.

According to embodiments of the invention the first groove and/or protrusion and the second groove and/or protrusion intersect in at least one first intersection region in the peripheral wall.

This means that the said grooves and/or protrusions are not parallel at least in sections and therefore can intersect in a specific intersection region. Therefore, the grooves advantageously extend at least in sections in different directions. The term "intersect" should not necessarily be understood to mean intersection at an angle of 90° but, as described in greater detail below, a corresponding intersection angle can also deviate from 90°.

In this case the term "groove" and/or "protrusion" is defined relative to a normal level of the peripheral wall. Thus, a groove is understood to be a geometric formation which extends inwards with respect to the peripheral wall, and a protrusion is understood to be a geometric formation which, relative to the bottle, extends outwards with respect to the peripheral wall.

In a preferred embodiment the said groove or protrusion functions as a so-called tension band. This tension band serves to absorb stresses, in particular also in the direction of this tension band. In a further advantageous embodiment, the said groove is of continuous construction.

It would also be possible for it to be an interrupted groove, for example a plurality of recesses which extend along a predetermined line. This means that in the context of the present application the groove does not necessarily have to be a continuous groove but can also be defined by a succession of recesses or depressions which extend in a predetermined direction.

In addition, designs could also be provided, for example linear grooves, which are in each case interrupted in the manner of a broken line or also a dash-dot line. In a further advantageous embodiment, the said base region also serves as a standing surface of the container. The grooves and/or protrusions are introduced into the container or the peripheral wall thereof by a blow moulding operation. The container is a blow moulded container and in particular a container which has been produced by a stretch blow moulding operation.

The advantage of the embodiment according to embodiments of the invention lies in the production of stabilising tension band structures, which at the same time can restrain an axial and a radial expansion of the PET containers under internal pressure. In this case, however, these restrictions do not have to take place uniformly in all directions, but overall a stable container is obtained.

These tension band structures are defined by one or more channel bases, that is to say the ratio of depth and height, which can lie above and below the container cross-section and/or which can be n-angular but at least 3-angular and at most co-angular (that is to say circular or oval) in cross-section. Furthermore, in their horizontal cross-sections these grooves can extend variably over the height of the main body or of the containers in different vertical sections.

This means that the said groove does not have to have a uniform depth and a uniform cross-section, but this latter can also change in an extension direction of the groove. The said grooves also do not have to be sharp-edged at their corners but can also be rounded. At least two but also up to an infinite number of guide curves are advantageously formed. The grooves advantageously have a predetermined gradient relative to the peripheral direction of the containers. In this case this gradient does not necessarily have to be constant.

Furthermore, the first groove has a positive gradient and the second groove has a negative gradient. In this way at least one, at least two junction points or junction regions of these said grooves are produced (designated here as intersection regions). In this case it is conceivable that the two grooves can also be configured in opposite directions in order thus to achieve a self-locking. Furthermore, as is explained better below, it is also possible that the grooves originate from the base region and/or extend over all or a part of the container height. The grooves can serve as a tension band which begins in the base region and extends into the body region. It is also possible that the said grooves have different or the same lengths. In addition, the grooves or the channels can have an aperture angle which can depart symmetrically or asymmetrically from a neutral axis of a guide curve or can be linked to the guide curve with a defined spacing and can be configured for example at a variable angle between 10° and 160°.

Thus, embodiments of the present invention make it possible that in principle any container cross-section can be produced with the most varied forms or shapes (that is to say, vertical cuts), since the external shape is retained by a type of exoskeleton or endoskeleton (defined by the tension band structures or the grooves). In this case the self-locking principle of structures working in opposite directions is used. Free-form surfaces are also provided. In addition, in combination with these over-spanned free-form surfaces, which are located between stabilising structures, surfaces which are very stable with respect to tension can be produced with low use of material. In this way containers can be produced which are in particular very lightweight but are stable for the internal pressure.

The main body of the containers has a wall thickness which is greater than 0.01 mm, preferably greater than 0.03 mm, and preferably greater than 0.05 mm. In a further preferred embodiment, the main body of the container preferably has a wall thickness which is less than 0.5 mm, preferably less than 0.4 mm, and preferably less than 0.3 mm. The embodiment described here is suitable in particular for containers with these said wall thicknesses since with such wall thicknesses, on the one hand, great improvements in the stability of the container are produced by the described structure of the grooves and/or protrusions and, on the other hand, with these wall thicknesses the said grooves and/or protrusions can also be manufactured particularly advantageously.

A plurality of grooves and/or protrusions is provided, which overall also form a plurality of intersection regions in the peripheral wall. A stabilising network is formed in the peripheral wall of the containers by this plurality of grooves and/or protrusions and the respective intersection points.

In a further advantageous embodiment, at least one groove and/or protrusion has a portion extending through the intersection region and this portion extends substantially in a straight line. In a further advantageous embodiment, the other groove and/or protrusion also has a portion extending through the intersection region and this portion also extends substantially in a straight line. In this case what is meant is a projection in a straight line relative to the peripheral wall of the container.

Thus if, for example, in a radial direction of the container a projection onto the said straight portion is performed, this will result in a substantially straight line. "In a substantially straight line" is understood also to include lines which have a finite but very high radius of curvature, for example a radius of curvature of more than 20 cm, preferably more than 30 cm, and preferably more than 50 cm. In this way a very high degree of stability is achieved precisely in the intersection region.

In a further advantageous embodiment, the first groove and/or protrusion and the second grove and/or protrusion intersect in an intersection region at a predetermined intersection angle α and this intersection angle is greater than 0.1°, preferably greater than 10°, preferably greater than 20° and particularly preferably greater than 30°. The said angle is particularly preferably greater than 40° and preferably greater than 50°.

In this case this intersection angle is understood to be the respective smaller angle which is produced at the intersection of two straight lines. Thus, this angle can have a maximum value of 90°. This angle is particularly preferably greater than 60°, preferably greater than 70° and preferably greater than 80°.

In a further advantageous embodiment, the groove and/or protrusion is continuous in the intersection region and/or is designed to run into the intersection region. This means that the groove and/or protrusion is not interrupted at least in the region of the intersection (or is interrupted substantially only by the cross-section of the intersecting groove and/or protrusion). In this embodiment the profile of this incoming groove and/or protrusion extends substantially to the edge of the respective intersecting groove and/or protrusion.

Advantageously both grooves and/or protrusions are continuous in the said intersection region and/or are designed to run into the intersection region. In this way a higher stability is also achieved precisely in the intersection region.

However, it is also possible that a configuration and/or a cross-section of the groove changes, for example increases, as it runs into the intersection region. Thus, for example the incoming groove can have a certain cross-section which increases in the intersection region.

In a further advantageous embodiment at least one groove and/or protrusion has an aperture angle of more than 10°, preferably more than 20°, preferably more than 30°, preferably more than 40°, particularly preferably more than 50° and particularly preferably more than 60°. In this case the aperture angle is understood to be an angle which results from a geometric extension of two groove boundary walls at their junction point thereof.

In a further advantageous embodiment at least one groove and/or protrusion has an aperture angle of less than 170°, preferably less than 150°, preferably less than 110°, particularly preferably less than 100°, preferably less than 90° and particularly preferably less than 80°.

Furthermore, in this case it is conceivable that boundary walls of this groove are formed substantially in a straight line.

In a further preferred embodiment at least one groove and/or protrusion has a groove base extending substantially in a straight line. In this case it is possible that this straight groove base transitions via curved corners or edges into side walls of the said groove. In a further advantageous embodiment, the groove has a trapezoidal cross-section. In this case the corners in which the groove base transitions into the side walls of the groove have a radius of curvature in a range from 0.2 mm to 0.5 mm.

In a further advantageous embodiment, the plastics material container has at least one further groove and/or protrusion in the wall which forms at least one intersection region with the first and/or the second groove and/or protrusion.

In a further advantageous embodiment, a plurality of such grooves and/or protrusions is provided, which extend—preferably uniformly—around the circumference of the container. In this way a plurality of intersection points are formed between the individual grooves and/or protrusions. Thus, overall, a stable skeleton structure for the container is produced.

In a further advantageous embodiment at least one groove and/or protrusion extends at least in sections spirally around the longitudinal direction of the container. Both the first and the second grooves extend substantially spirally around the longitudinal direction or around the main body of the container. The first and the second grooves advantageously extend in each case spirally in the peripheral direction around the container, but with different gradients. In this way, overall, intersection regions can be achieved between the individual grooves or protrusions.

In a further advantageous embodiment these spirals, as mentioned above, have a constant gradient.

Advantageously a first group of first grooves is provided which preferably extend parallel to one another, and a second group of second grooves is provided which are preferably likewise parallel to one another. In this way these first and second grooves form a plurality of intersection regions.

In a further advantageous embodiment at least one intersection region is formed as a depression in which the at least one groove and/or protrusion runs in. This means that the actual groove is not present in the said intersection region, but in particular transitions jointly with the other groove or protrusion into a depression of the intersection point. Advantageously the depression has a cross-shaped profile.

In a further advantageous embodiment at least two base grooves and/or base protrusions are arranged in the base region and at least one of these base grooves and/or base protrusions transitions into at least one the grooves and/or protrusions formed in the peripheral wall. In this case this base groove transitions directly into at least one of the aforementioned grooves.

In a further advantageous embodiment is a branching region is provided, in which a base groove transitions into two grooves. In this case these are two grooves which continue in different peripheral directions of the container wall.

Supporting feet of the containers are formed by the grooves in the base region. Thus, the grooves in the base region also serve advantageously as so-called tension bands.

Therefore, in a further advantageous embodiment at least one base groove and/or base protrusion transition into two grooves and/or protrusions in the branching region. This branching region is also advantageously formed as a depression and has a triangular configuration. Advantageously the said branching region is formed in the region of an outer periphery of the container, no longer in a region in which the container stands.

At least one of the grooves and/or protrusions has a curved configuration following the branching region. The base groove and/or base protrusion in a portion before the branching region extends substantially in the longitudinal direction of the container, and in the region of the branch at least one of the said grooves and/or protrusions and both grooves and/or protrusions extend in a curved manner in the direction of the mouth of the container. The number of base grooves which protrude into the branching regions corresponds to the number of branching regions.

In a further preferred embodiment, the grooves and/or protrusions form a skeleton of the container.

The container advantageous has at least one further groove and/or protrusion and in particular a peripheral groove in the peripheral wall. In this case this can intersect several of the above-mentioned grooves or protrusions and can also intersect the intersection regions.

This peripheral groove is advantageously formed in a gripping region of the container. In a further advantageous embodiment several grooves (which are in particular horizontal with respect to the longitudinal direction of the containers) are also provided.

In a further advantageous embodiment, the container has a shoulder region in which a cross-section of the container is tapered and in which the main body transitions into the mouth region of the container.

An even number of grooves and/or protrusions are advantageously arranged on the main body. In this case it is possible that a second groove is also associated with each first groove.

Furthermore, embodiments of the present invention are directed to a blow mould for producing plastics material containers. This blow mould has a first side part and a second side part which in an assembled state of the blow mould enclose at least one cavity, inside which plastics material parisons can be formed into plastics material containers. Furthermore, this blow mould has a shaping inner wall for producing the wall of the plastics material containers.

According to embodiments of the invention the shaping inner wall of the blow mould is formed in such a way that it is suitable and intended for producing a container of the type described above.

Furthermore, in a further advantageous embodiment the blow mould has a base part. In this way the two side parts and the base part enclose the said cavity for receiving the containers.

Advantageously the wall of the blow mould has inverted protrusions and/or grooves, which produce the corresponding grooves and/or protrusions of the plastics material container.

BRIEF DESCRIPTION

Some of the embodiments will be described in detail, with references to the following Figures, wherein like designations denote like members, wherein:

FIG. 2a shows a representation of two grooves in an intersection region;

FIG. 2b shows a cross-section of a groove;

FIG. 3a show an explanatory representation of a configuration of grooves;

FIG. 3b shows a representation for illustration of an intersection region;

DETAILED DESCRIPTION

Figure 1:
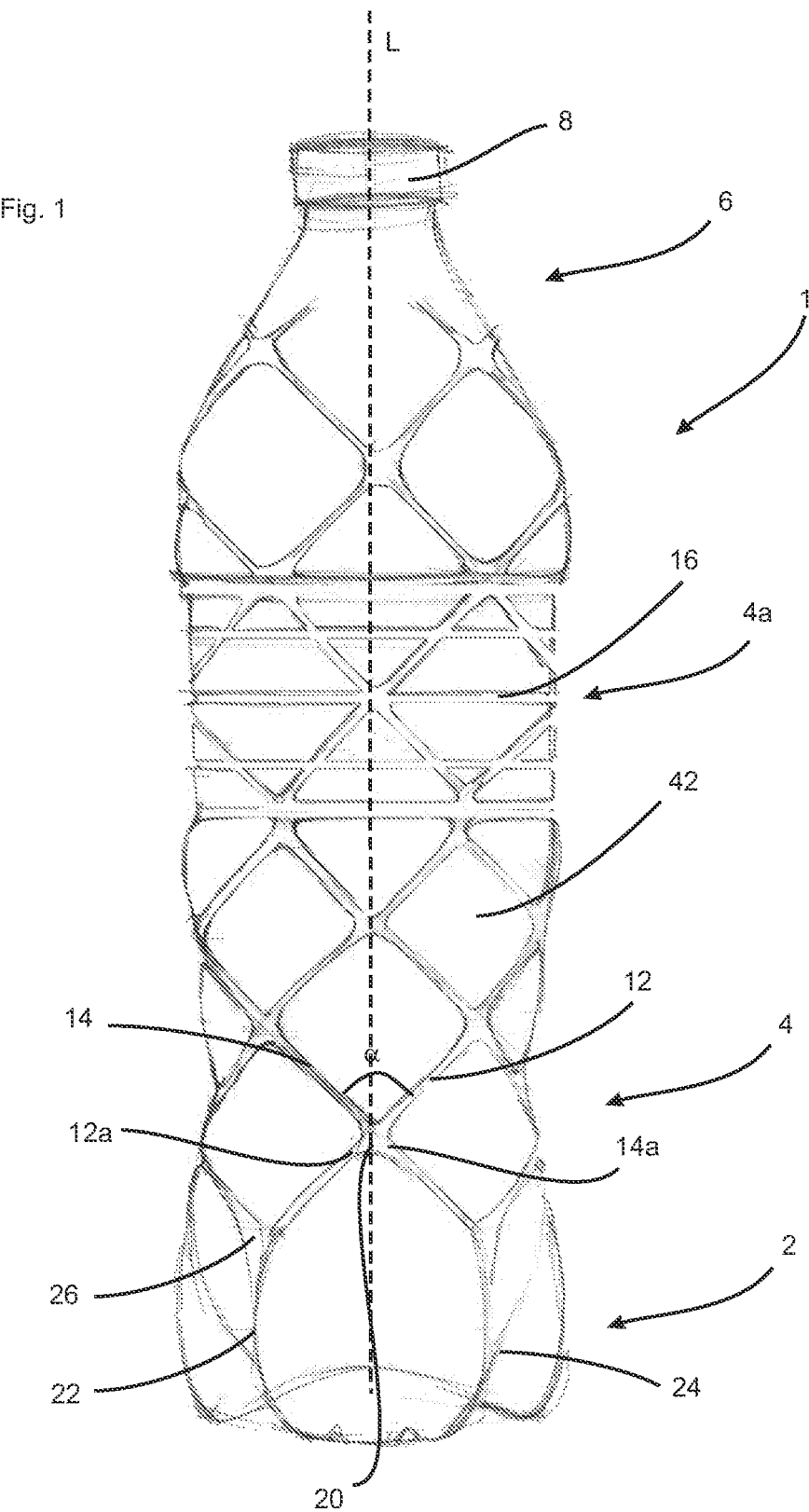
FIG. 1 shows a representation of a plastics material container.

FIG. 1 shows a representation of a plastics material container 1 according to embodiments of the invention. This plastics material container has a base region 2 which also serves simultaneously as a standing surface. This base region 2 adjoins the main body 4. A mouth region 6 having a mouth 8 in turn adjoins the main body. The reference numeral 12 designates a first groove which extends spirally in the wall 42 of the container. The reference numeral 14 designates a second groove which likewise extends spirally in the wall 42. These two grooves jointly form an intersection region 20. The reference numeral L relates to a longitudinal direction of the container 1.

The reference numerals 12a and 14a relate to portions of the grooves which run into the intersection region 20. The reference α designates an angle which the two grooves enclose with one another. In the variant shown in FIG. 1 this angle is approximately 90°. This is also a preferred configuration which ensures a particular degree of stability of the container. The intersection region here is formed as a depression into which the two grooves 12 and 14 run. In this region in which the grooves run in, the cross-sections are expanded.

The reference numerals 22 and 24 designate base grooves or a tension band in the region of the base 2. This tension band 22 likewise leads in the manner of a groove to a branching point or branching region 26. Both a first groove 12 and a second groove 14 branch off at this branching point 26.

The reference numeral 16 designates a horizontal and peripheral groove which is arranged in a gripping region 4a of the container. This groove extends in a closed manner peripherally around the wall 42 of the container 1.

FIG. 2a shows a detail of the region 20 in which two grooves 12 and 14 converge. Here the two grooves are shown which intersect in the intersection region 20. More precisely, the two grooves run into the intersection here without being significantly expanded. This means that a groove here is interrupted substantially only by the cross-section of the respective other groove.

FIG. 2b shows a cross-section of a groove. It will be recognised that this cross-section has a trapezoidal configuration. In this case the reference numerals 34 and 36 relate to two lateral boundary walls of the groove and the reference numeral 32 relates to a groove base. In this case this groove base extends in a straight line and transitions via curved corners 44 into the two side walls 34 and 36. The reference $\beta$ designates an aperture angle of the said groove. These is defined relative to a geometric junction point of the two side walls 34 and 36 (i.e. the geometric extension thereof, not shown).

FIG. 3a shows a schematic representation for illustration of the spiral configuration of the grooves 12 and 14. These grooves form a first intersection region 20 and a further intersection region 20a. The number of such intersection regions formed depends upon a number of factors, such as in particular a height of the container or also a gradient angle of the grooves. In any case it will be recognised that the grooves 12 and 14 extend spirally on the outer periphery 42 of the container 1.

FIG. 3b shows a detail, namely the intersection region 20 between the two grooves 12 and 14. In this case it is possible that the channel base or the groove base extends variably over the container height. As shown in FIG. 3a, at least two such grooves or guide curves are provided. In this case, as mentioned above, these can have a constant or variable gradient. Furthermore, as mentioned, a groove with a positive gradient and a groove with a negative gradient are present, which can intersect n times. The intersection region 20 shown in FIG. 3b shows the two grooves 12 and 14 which intersect at the angle $\alpha$.

Figure 4:
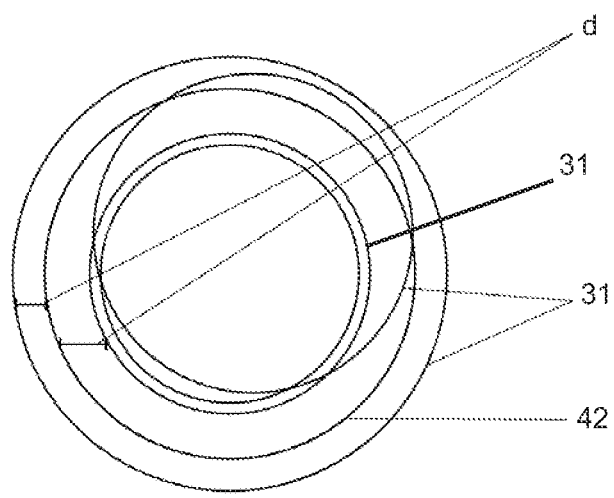
FIG. 4 shows a plan view to illustrate a groove configuration.

FIG. 4 shows a further representation or a cross-sectional representation of the container. In this case the reference numeral 42 in turn relates to the cross-section (or the peripheral wall) of the container itself. The reference numeral 31 designates two possible configurations of a groove or a channel base. In this case it will be recognised that, as designated by the reference d, there are variable distances d between the container cross-section and the respective groove bases or channel bases.

Figure 5:
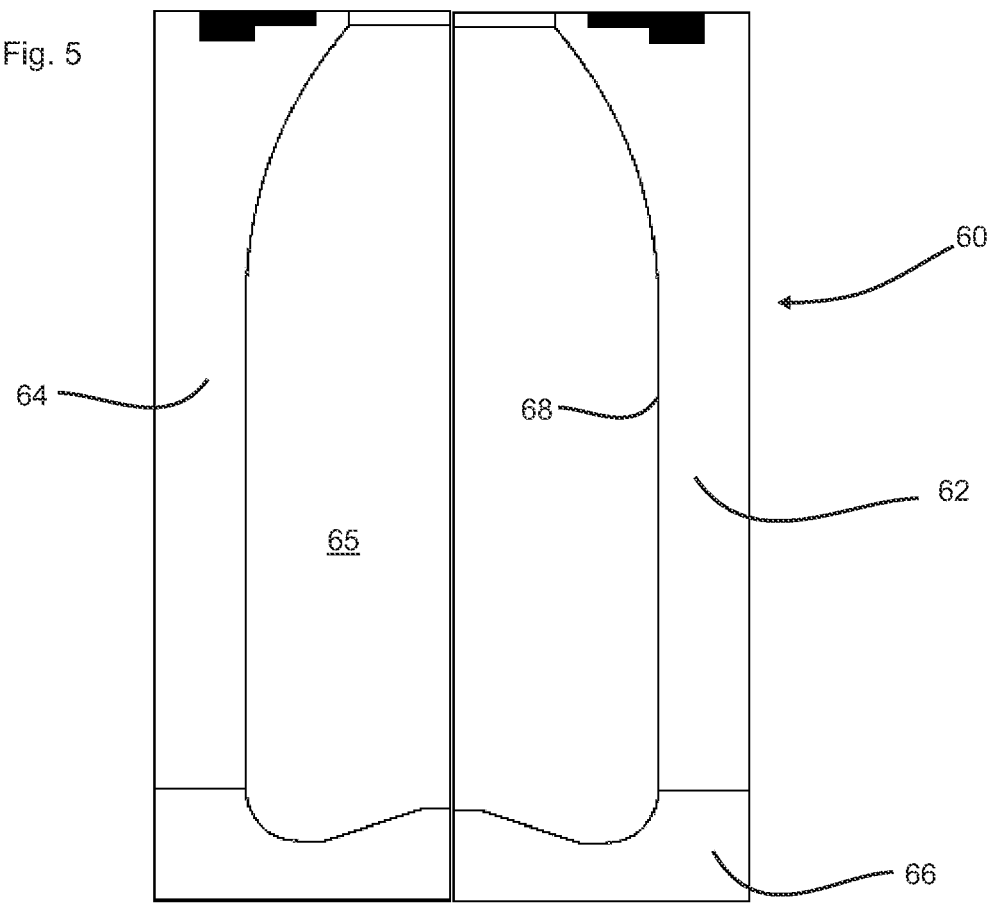
FIG. 5 shows a sectional representation of a blow mould.

FIG. 5 shows a sectional representation of a blow mould 60 for producing a container according to embodiments of the invention. This blow mould 60 has a first side part 62 and a second side part 64. In addition, the blow mould also has a base part. This base part 66 and the side parts 62 and 64 in a closed state of the blow mould form a hollow space 65 within which the plastics material parisons can be expanded to form the plastics material containers.

The reference numeral 68 designates an inner wall of the side parts. In this case it can likewise have grooves or protrusions and specifically the configuration which can be produced or blown in the context of a blow moulding process of a container according to embodiments of the invention or for example the container illustrated in FIG. 1.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCES 1 container
2 base region
4 main body
4a gripping region of the main body 4
6 mouth region
8 mouth
12 groove
12a portion of the groove
14 groove
14a portion of the groove
16 horizontal groove
20, 20a intersection region
22, 24 base groove, tension band
26 branching point, branching region
31 configurations of the groove
32 groove base
34, 36 boundary wall of the groove
42 peripheral wall of the base body
44 corners of the groove
60 blow mould
62 first side part
64 second side part
65 hollow space
66 base part
68 inner wall
$\alpha$ intersection angle of the grooves 12, 14
$\beta$ aperture angle of the grooves
d variable distances
L longitudinal direction of the container

The invention claimed is:

1. A plastics material container with a base region, a main body adjoining this base region in a longitudinal direction of the plastics material container, wherein this main body has a peripheral wall extending completely around in a peripheral direction of the plastics material container, and a mouth region with a container mouth following at least indirectly to this main body in the longitudinal direction, wherein this peripheral wall of the main body has at least one first groove and/or protrusion extending in a first direction and at least one second groove and/or protrusion extending in a second direction, wherein the at least one first groove and/or protrusion and the at least one second groove and/or protrusion intersect in at least one first intersection region in the peripheral wall, characterised in that at least two base grooves and/or base protrusions are arranged in the base region and the at least two base grooves and/or base protrusions each separately transitions in a branching region into at least two grooves and/or protrusions formed in an outer peripheral wall of the container, wherein at least one of: the at least one first groove and/or protrusion, the at least one second groove and/or protrusion, and the at least two base grooves and/or base protrusions are introduced into the outer peripheral wall of the container by a blow moulding operation, wherein at least one groove and/or protrusion extends at least in sections spirally around the longitudinal direction of the container, wherein the at least one first groove and/or protrusion has a positive gradient and the at least one second groove and/or protrusion has a negative gradient wherein the branching region is formed as a depression, and wherein the branching region has a triangular configuration.

2. The plastics material container according to claim 1, wherein at least one groove and/or protrusion has a portion extending through the intersection region and this portion extends substantially in a straight line.

3. The plastics material container according to claim 1, wherein the at least one first groove and/or protrusion and the at least one second groove and/or protrusion intersect in the intersection region at a predetermined intersection angle α and this intersection angle α is at least one of greater than 0.1°, greater than 10°, greater than 20° and greater than 30°.

4. The plastics material container according to claim 1, wherein at least one groove and/or protrusion is continuous in the intersection region and/or is designed to run into the intersection region.

5. The plastics material container according to claim 1, wherein at least one groove and/or protrusion has an aperture angle of more than 10°, more than 20°, more than 30°, more than 40°, more than 50° and more than 60°.

6. The plastics material container according to claim 1, wherein at least one groove and/or protrusion has an aperture angle of less than 170°, less than 150°, less than 130°, less than 110°, less than 100°, less than 90° and less than 80°.

7. The plastics material container according to claim 1, wherein at least one groove has a straight groove base.

8. The plastics material container according to claim 1, wherein the plastics material container has at least one further groove and/or protrusion in the peripheral wall which forms at least one intersection region with at least one of the at least one first groove and/or protrusion and the at least one second groove and/or protrusion.

9. The plastics material container according to claim 1, wherein at least one intersection region is formed as a depression into which at least one of the at least one first groove and/or protrusion and the at least one second groove and/or protrusion runs.

10. A blow mould for producing plastics material containers with a first side part and a second side part, which in an assembled state of the blow mould enclose at least one cavity, inside which plastics material parisons can be formed into the plastics material containers, wherein this blow mould has a shaping inner wall for producing the wall of the plastics material containers, characterised in that the shaping internal wall of the blow mould is formed in such a way that it is suitable for producing a container according to claim 1.

11. The plastics material container according to claim 1, wherein the plastics material container is a container which has been produced by a stretch blow moulding operation.

12. The plastics material container according to claim 1, wherein the at least one base groove and/or protrusion transitions in the branching region into the at least two grooves and/or protrusions and the at least two grooves and/or protrusions continue in different peripheral directions of the peripheral wall.

13. The plastics material container according to claim 1, wherein supporting feet of the plastics material container are formed by the at least two base grooves and/or base protrusions in the base region, such that the at least two base grooves and/or base protrusions in the base region also serve as tension bands.

14. The plastics material container according to claim 1, wherein said branching region is formed in a region of an outer periphery of the plastics material container.

15. The plastics material container according to claim 1, further comprising at least two branching regions, wherein the number of base grooves and/or base protrusions which protrude into the branching regions corresponds to a number of the at least two branching regions.

16. The plastics container according to claim 1, wherein both the at least one first groove and/or protrusion extending in the first direction and the at least one second groove and/or protrusion extending in the second direction extend at least in sections spirally around the longitudinal direction of the container.

17. A plastics material container with a base region, a main body adjoining the base region in a longitudinal direction of the plastics material container, wherein the main body has a peripheral wall extending completely around in a peripheral direction of the plastics material container, and a mouth region with a container mouth following at least indirectly to this main body in the longitudinal direction,
wherein the peripheral wall of the main body has at least one first groove extending in a first direction and at least one second groove extending in a second direction, wherein the at least one first groove and the at least one second groove intersect in at least one first intersection region in the peripheral wall,
wherein at least two base grooves are arranged in the base region and the at least two base grooves each transition in a branching region, wherein at least one based groove of the at least two base grooves transitions in the branching region into the at least one first groove and the at least one second groove,
wherein at least one of: the at least one first groove, the at least one second groove, and the at least two base grooves are introduced into the outer peripheral wall of the container by a blow moulding operation,
wherein at least one of the at least one first groove and the at least one second groove extends at least in sections spirally around the longitudinal direction of the container,
wherein the at least one first groove has a positive gradient and the at least one second groove has a negative gradient,
wherein supporting feet of the plastics material container are formed by the at least two base grooves in the base region, such that the at least two base grooves in the base region also serve as tension bands,
wherein the branching region is formed as a depression, and
wherein the branching region has a triangular configuration.

* * * * *